(12) United States Patent
Seibert

(10) Patent No.: US 7,872,557 B2
(45) Date of Patent: Jan. 18, 2011

(54) INDUCTIVE INTERFACE FOR AN ARTICLE OF CLOTHING AND USE OF THE INTERFACE

(76) Inventor: Johann Seibert, Horemannstrasse 26a, 80636 Muenchen (DE)

(*) Notice: Subject to any disclaimer, the term of this patent is extended or adjusted under 35 U.S.C. 154(b) by 859 days.

(21) Appl. No.: 11/576,288

(22) PCT Filed: Sep. 26, 2005

(86) PCT No.: PCT/EP2005/010388

§ 371 (c)(1),
(2), (4) Date: Jul. 11, 2007

(87) PCT Pub. No.: WO2006/037507

PCT Pub. Date: Apr. 13, 2006

(65) Prior Publication Data
US 2007/0250981 A1    Nov. 1, 2007

(30) Foreign Application Priority Data
Sep. 30, 2004    (DE) .................. 10 2004 047 650

(51) Int. Cl.
*H01F 21/04* (2006.01)
*H01F 21/06* (2006.01)
*H01F 5/00* (2006.01)

(52) U.S. Cl. .................. 336/117; 336/118; 336/130; 336/132; 336/200

(58) Field of Classification Search .............. 455/91, 455/100; 439/37
See application file for complete search history.

(56) References Cited

U.S. PATENT DOCUMENTS

| 5,165,098 | A  |    | 11/1992 | Hoivik |
|-----------|----|----|---------|--------|
| 5,297,201 | A  |    | 3/1994  | Dunlavy |
| 6,324,053 | B1 |    | 11/2001 | Kamijo |
| 6,895,261 | B1 | *  | 5/2005  | Palamides ............ 455/575.6 |
| 6,956,614 | B1 | *  | 10/2005 | Quintana et al. ......... 348/373 |
| 7,076,206 | B2 |    | 7/2006  | Elferich et al. |
| 7,319,895 | B2 | *  | 1/2008  | Klefstad-Sillonville et al. ................ 600/388 |

(Continued)

FOREIGN PATENT DOCUMENTS

DE    196 21 003    11/1997

(Continued)

OTHER PUBLICATIONS

Anonymous, Electromagnet, Jul. 15, 2004, Internet Article.

(Continued)

*Primary Examiner*—Anh T Mai
(74) *Attorney, Agent, or Firm*—Dianne Burkhard; Carol A. Lewis White

(57) ABSTRACT

The invention relates to an article of clothing (10) comprising at least one layer consisting of a flexible material and an inductive coupling device (20) for transmitting an electric current and/or data signals through the layer or layers of the flexible material. The invention also relates to an inductive interface for an article of clothing, which can inductively transmit an electric current and/or data between the interior and the exterior of an article of clothing, with which the interface is used. In addition, the invention relates to the use of an interface of this type for sending an electric current and/or data signals through a textile layer of an article of clothing.

32 Claims, 7 Drawing Sheets

U.S. PATENT DOCUMENTS

| | | | |
|---|---|---|---|
| 2003/0034868 A1* | 2/2003 | Osada | 336/200 |
| 2006/0270471 A1* | 11/2006 | Matthiessen et al. | 455/575.6 |
| 2007/0075818 A1* | 4/2007 | Hansen | 336/200 |
| 2007/0287516 A1* | 12/2007 | Cheung et al. | 455/575.6 |

FOREIGN PATENT DOCUMENTS

| | | |
|---|---|---|
| DE | 101 19 283 | 10/2002 |
| DE | 102 01 265 | 7/2003 |
| DE | 102 59 734 | 7/2004 |
| WO | 01/45038 | 6/2001 |
| WO | 2005/055390 | 6/2005 |

OTHER PUBLICATIONS

Applied Cryptography, Schneier, Bruce, New York, John Wiley & Sons, Inc., $2^{nd}$ edition, 1996, pp. 466-474, 336-339, 265-302, 517-518, 566-571.

* cited by examiner

INDUCTIVE INTERFACE FOR AN ARTICLE OF CLOTHING AND USE OF THE INTERFACE

FIELD OF THE INVENTION

The present invention relates to an article of clothing (garment), to an inductive clothing interface, and to the use of the interface for garments.

BACKGROUND OF THE INVENTION

Electronic devices for personal use have been miniaturised to enable portability, thereby enhancing utility and functionality for devices such as laptops, cellphones, calculators, handheld organisers, portable radios, or CD players as well as other similar devices. Sufficient miniaturisation has made it possible to integrate electronics into everyday items, such as clothing.

Many articles of clothing have now been made to incorporate pockets for carrying devices like cellphones, compact disc players, and portable audio players or other electronic equipment.

From prior art, the concept of a "wearable computer" is well-known, such a wearable computer comprising a powerful, yet very small and ergonomically designed computer system that can be worn by the user over extended periods of time, usually kept at or on the clothing. It is desirable to integrate the small electronic devices and/or the wearable computer along with its periphery devices with textiles and garments, dramatically increasing the functionality and portability of the devices. Hands-free operation is a goal of many of these efforts.

For certain advanced functions, personal electronic devices and/or wearable computers may be equipped with various sensors which have preferably or intrinsically to be worn on the body of the user, e.g. for detecting the pulse frequency, the ECG waveform, respiration, footstep rate or other parameters of the user.

On the one hand, in such cases the output signals of such sensors need to be transmitted from the inner side of a garment to electronic devices and/or wearable computers located outside of the garment. Such sensors are of particular importance in conjunction with certain kinds of professional clothing, e.g. protective clothing for fire-fighters or protective uniforms for military personnel. However, it should be clear that the use of sensors is not limited to such kinds of protective clothing as there are other fields of application e.g. for outdoor leisure clothing, etc.

On the other hand, intelligent sensors or other electronic devices located at the inner side of the garment may need to be fed with control data or the like from a computer located at the outer side of the garment.

Hence, for advanced solutions, a bidirectional data transfer between some kind of apparatus located on the outer side of the garment and other components located on the inner side of the garment is desirable.

In many cases, the electronic components located on the inner side of the garment may need some form of electrical power supply. This can be done by providing a separate battery or accumulator nearby or at the respective electronic components; however, it would clearly be advantageous to provide an electrical power supply through the same means provided for data transfer in order to reduce system complexity and costs.

Another important aspect of modern garments relates to the technical properties in respect of permeability for liquid water and water vapour. In particular with regard to outdoor applications, garments should be waterproof. For advanced applications, however, water vapour should be able to pass through in order to enhance the comfort of wearing of such textiles by avoiding or at least reducing the moistening of the skin of a user with sweat. There are various enhanced textile materials known comprising some sort of membrane (e.g. made of microporous polytetrafluoroethylene PTFE) which is permeable for water vapour but impermeable for water in the liquid form.

When establishing the path for delivery of electrical power and/or data signals from at least one electronic device mounted on the outer side of a garment to a sensor or another electronic component mounted on the inner side of the garment, a solution is needed for the problem of passing data and/or electricity through the textile of the garment. In cases where a waterproof garment is to be used, precautions must be taken in order to make sure that any electronic facilities for data and/or electrical power transmission will not harm the waterproof properties of the garment.

From U.S. Pat. No. 6,324,053 B1, a system and method for the electrical interconnection of devices included in a wearable computer or in a similar system have come to be known. A power supply and data network are formed by attaching to clothing, as stitches, an extremely fine conductive wire that is used to connect devices included in a wearable computer wherein an I/O device and a computer system main body are separately located.

The network as disclosed by said U.S. Pat. No. 6,324,053 B1 is, taken as such, suited for connecting sensors or other electronic components mounted on the inner side of a certain garment with a wearable computer or with other electronic devices mounted on the outer side of an electronic garment. However, introducing a fine conductive wire as stitches means that such an attempt is in particular incompatible with providing a waterproof but vapour-permeable garment equipped with a membrane. Such a membrane would inevitably be pierced many times by the stitches necessary for setting up the network, creating undesirable water bridges. Practical experience has shown that it is very difficult to close such water bridges along the stitches. Moreover, the fine wires provide a galvanic coupling which might cause electrical problems such as an electrical hazard or poor electrical properties.

From patent application WO 01/45038 A2, a short range communication system has come to be known. In a particular implementation thereof an interrogator held near a person interrogates multiple transponders and receives information separately from the transponders. The interrogator and/or the transponders may be held in an article of clothing or in an item of baggage of the person. Such a system enables the clothes worn by a person to communicate with a plurality of items e.g. for obtaining useful information. In principle, a short range communication system known from patent application WO 01/45038 A2 can also be used for transmitting sensor data from a sensor mounted on the inner side of the garment through the (textile) material thereof to any electronic device or wearable computer mounted on the outer side of the garment without any piercing of the garment.

However, in a number of cases the user of wearable computers or other comparable electronic devices for personal use must be protected against eavesdropping by exploitation of outbound compromising electromagnetic emanations as well as against disturbances caused by electromagnetic interference (EMI) of inbound electromagnetic radiation of the environment, in particular caused by strong electromagnetic pulses (EMP).

This is in particular relevant with regard to military applications; to some degree these requirements are also to be met e.g. with regard to professionals like fire-fighters etc.

Moreover, a pure radio-based solution is not suitable for providing electronic components located at the inner side of the garment with a substantial amount of electrical power provided at the outer side of the garment. There are also concerns about the biological hazards which perhaps might be caused by the exposure of living tissue to relatively strong fields of high frequency electromagnetic radiation which would be necessary for an effective transmission of electrical power by a high frequency electromagnetic field.

Hence, although wireless connectivity may provide suitable advantages, there are fields of application where the interconnection of electronic devices for personal use and/or a wearable computer with their periphery by means of (preferably shielded) electric wires might be preferred over wireless solutions.

Providing a connecting wire intersecting the textile material forming the garment is, however, very problematic in any cases where waterproof properties are critical.

Hence, there is a strong need for providing an advanced garment being equipped with facilities for interconnecting electronic devices amongst each other and/or a wearable computer with its related periphery, whereby electrical power supply and/or data paths have to be provided through the textile material without the need to pierce the material forming the garment or, at least, where the boundaries of the material forming the garment can reliably be made waterproof.

BRIEF SUMMARY OF THE INVENTION

Hence, it is an object of the present invention to improve such a garment which allows electrical power to be supplied and/or data streams to pass through the textile material forming the garment.

It is an object of the present invention to improve an inductive interface which allows electrical power to be supplied and/or data streams to pass through the fabric forming the garment.

These objects of the invention are solved by providing an article of clothing as well as by providing an inductive clothing interface, and by proposing the use of the interface for passing electrical power and/or data signals through a layer of fabric of an article of clothing.

An article of clothing is provided, the article of clothing comprising at least one layer of a flexible material as well as an inductive coupling means for passing electrical power and/or data signals through the at least one layer of the flexible material. The flexible material need not to be a fabric (it might e.g. be a sheet or foil made of plastics); however, in many applications a fabric will be preferred as material for the article of clothing.

An inductive clothing interface capable of transmitting electric power and/or data between an inner side and an outer side of an article of clothing with which the interface is to be used is also provided, the article of clothing comprising a material layer and the interface comprising an inductive coupling means, the inductive coupling means having a first coupling unit designed to be fixed to the material layer and comprising a first coupling portion designed to be accessible from an outer side of the material layer, the first coupling portion being provided with a first coil embedded in insulating material of the first coupling portion and designed to be operatively connected with an internal electric system located at the inner side of the clothing; a second coupling unit comprising a second coupling portion which is designed to be detachably mated with the first coupling portion, the second coupling portion being provided with a second coil embedded in insulating material of the second coupling portion and designed to be operatively connected with an external electric system located at the outer side of the clothing; the first and second coupling units being designed such that the first and second coils are able to perform said inductive transmission of electric power and/or data when the first and second coupling portions are mated. At least one of the first and second coupling units includes an electronic circuit designed to convert data signals to be coupled through the coupling device in accordance with at least one predefined data transmission protocol.

By means of inductive coupling, energy and/or data can be transmitted contactlessly by a transformer, a first coil thereof being located on the outer side of a garment, and a second coil thereof being located on the inner side thereof.

The present invention may be used in conjunction with garments equipped with a functional layer. A functional layer is a layer forming part of the material constituting the garment which gives the garment at least one relevant property. In particular, a functional layer can be a waterproof layer making the garment impermeable for liquid water. A more advantageous functional layer can be a semi-permeable layer, i.e., a membrane layer permeable for water vapour but impermeable for liquid water. Such semi-permeable functional layers can be made of expanded polytetrafluoroethylene (ePTFE).

BRIEF DESCRIPTION OF THE DRAWINGS

Various aspects of the invention and of different embodiments thereof will now be explained in greater detail using the accompanying drawing:

FIG. 5 shows the variation of the inductive coupler as depicted in FIG. 4. In particular, FIG. 5a shows a cross section of such a coupler, whereas

DETAILED DESCRIPTION OF THE INVENTION

Figure 1:
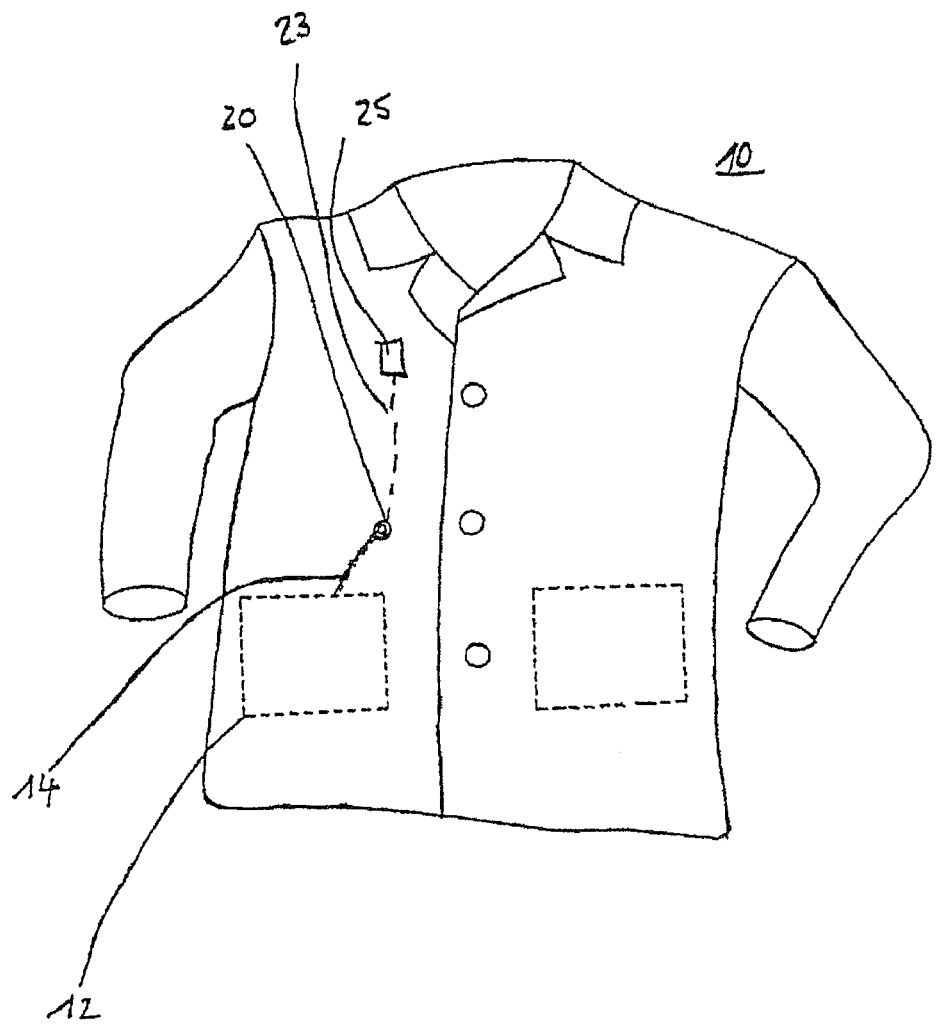
FIG. 1 shows a garment with an inductive coupler in accordance with the present invention.

In FIG. 1, a jacket 10 is equipped with an inductive coupler 20 in accordance with the invention. In a pocket 12 mounted on the outer side of the jacket 10, a user (not shown) has stored an electronic device (not shown) connected by a wire 14 with the inductive coupler 20. The electronic device stored in the pocket 12 might be e.g. a computer, a telemetric sender/receiver unit, or a digital data and/or voice recorder. On the inner side of the jacket 10, the inductive coupler 20 is connected via a second wire 23 with a sensor 25 fixed on the body of the user (not shown). The sensor 25 can be e.g. a body temperature sensor, a pulse sensor, or a heart signal sensor.

Instead of the sensor 25, other electronic components to be used on the inner side of the jacket can, in a preferred embodiment, be connected with the inductive coupler 20. For example, a microphone (not shown) might be used instead of the sensor 25. In an even more advanced embodiment, the wiring 23 can be implemented by a digital bus system enabling a multitude of electrical components to be connected with the inductive coupler 20.

Figure 2:
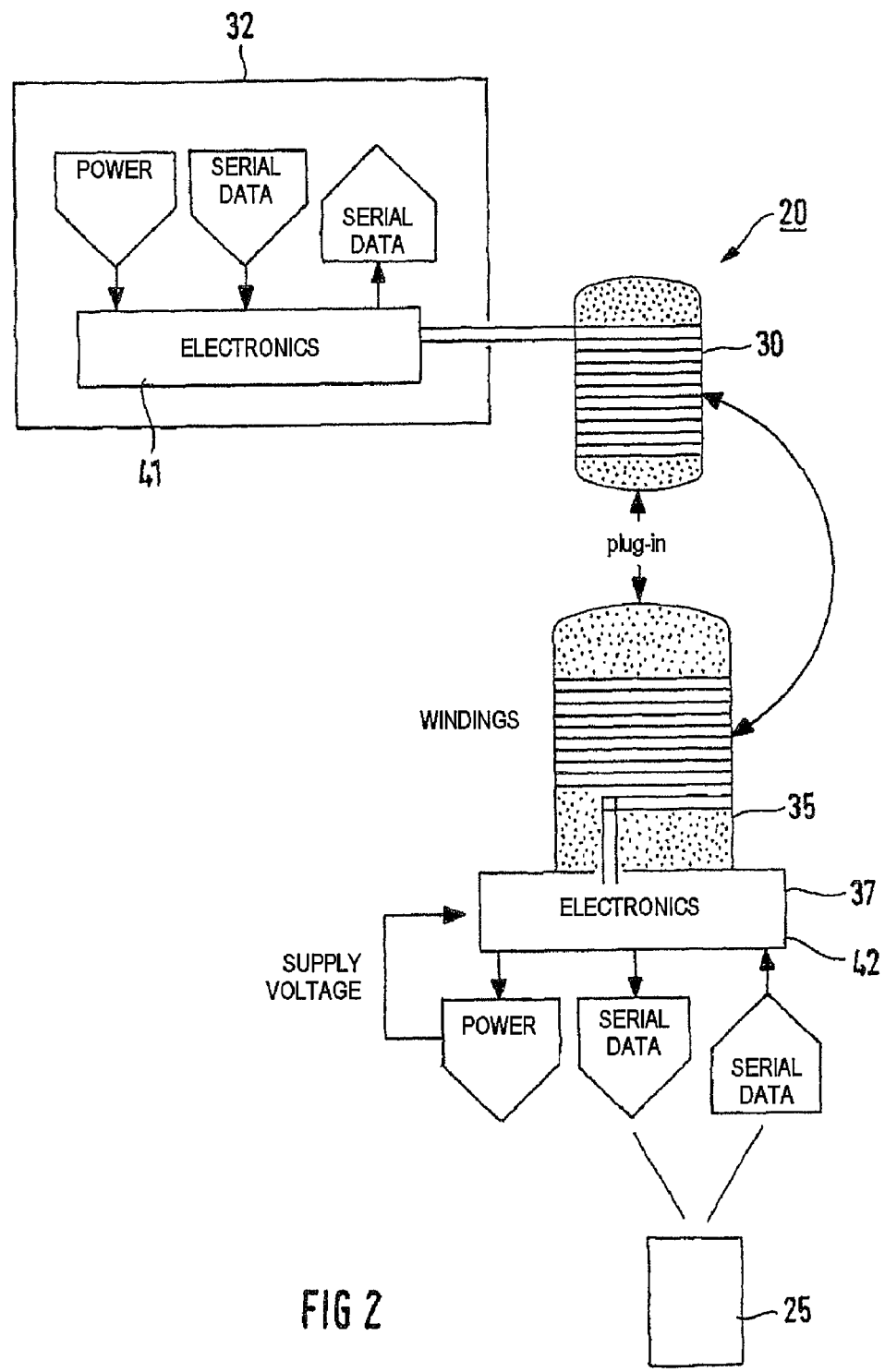
FIG. 2 shows a schematic electric circuit diagram illustrating the proper implementation of a circuit for use in conjunction with the garment comprising an inductive coupler in accordance with the present invention.

With regard to FIG. 2, the inductive coupler 20 comprises a first coil 30 connected with an electronic device 32 on the outer side of the jacket 10, and a second coil 35 connected with the at least one sensor 25 at the inner side of the jacket 10.

The basic function of the inductive coupler 20 is twofold:
a) Firstly, the first coil 30 is fed with an alternating current (AC) of suitable voltage and frequency such that it functions like the primary winding of a transformer, whereas the second coil 35 picks up energy from the resulting alternating magnetic field of the first coil 30 like the secondary winding of a transformer and delivers a corresponding output voltage which can be fed into a coupler control block 37 where it is rectified and filtered for use as supply voltage for any attached electrical components at the inner side of the jacket 10. Frequency, voltage and current values are set up in accordance with the usual rules for loosely coupling transformers.
b) Secondly, the first coil 30 oriented to the outer side of the jacket 10 and the second coil 35 oriented to the inner side of the jacket 10 are utilised as a coupler transformer to transfer information-carrying signals from the electronic device 32 to the sensor 25 and vice versa. In order to avoid interference with the alternating current fed to the first coil 30 for power supply purposes, the frequency of the information-carrying alternating current should preferably be different from the frequency of the power supply alternating current.

In one embodiment of the present invention the first and second coils are made of several windings of a copper (Cu) wire, e.g. the first coil 30 can be made of 45 windings of a Cu wire of 0.3 mm diameter. The second coil 35 can be made of 60 windings of a Cu wire of 0.224 mm diameter. In an embodiment a supply voltage of approximately 14 V is fed into the first coil 30. The voltage obtained at the second coil 35 is approximately 3 V. Under maximum load, the current in the first coil 30 amounts to approximately 230 mA, whereas the corresponding current in the second coil 35 is approximately 80 mA.

For transferring information-carrying signals, frequencies in the range from approximately 50 kHz up to approximately 500 kHz are used in an embodiment. However, in other embodiments frequencies at least in a range from approximately 1 kHz up to several MHz can be utilised.

It is believed that electromagnetic fields in such frequency ranges are physiologically harmless. In fact, in view of the mechanical and electrical properties of the embodiments, the magnetic component is dominant over the electric component. Alternating magnetic fields of low intensity and of a relatively low frequency are deemed to cause no health hazards.

From the patent application DE 196 21 003 A1, an inductive coupler for transferring electrical energy as well as electrical information-carrying signals has come to be known. This document describes the very basic principle of an inductive coupler and is deemed to be incorporated by reference here.

In order to be coupled through the coupling device, information-carrying data signals need to be formed in accordance with at least one predefined data transmission protocol.

In a basic embodiment of the invention, the inductive coupler 20 used with the garment allows a simplex information transfer only; i.e., information can only be transferred from the electronic device 32 to some electronic component (not shown) located at the inner side of the jacket 10 only or, alternatively, in a more preferred embodiment, from the sensor 25 at the inner side of the jacket 10 to the electronic device located at the outer side of the jacket 10 only.

However, in a more advanced embodiment of the invention, it is advantageous to enable a duplex data transfer in both directions. Such duplex data transfer can be implemented in particular in accordance with two alternative principles:
a) In a frequency-multiplexing solution, signals inbound to any electronic components located at the inner side of the jacket 10 are carried on a different carrier frequency than outbound signals originating from any electronic components at the inner side of the jacket 10 travelling to the electronic device 32. This frequency-multiplexing method is advantageous insofar as it enables parallel data transfers at the same time; however, dealing with two different carrier frequencies requires providing two different modulation/demodulation stages, one for each direction (not shown).
b) Alternatively, a time-multiplexing method may be utilised. In this case, a semi-duplex mode of operation is established by alternately dedicating the signal path through the inductive coupler for one of both data transmission directions. For this case, some sort of controlled switch must be provided governing the direction of the flow of information-carrying signals at any time.

With regard to the present invention, both frequency-multiplexing as well as time-multiplexing methods can be utilised. In any case, on each side of the communication link provided by the inductive coupler 20, a suitable electronic unit 41 respectively 42 has to be provided for modulation, demodulation, and control purposes.

The predefined data transmission protocol can preferably be made compatible with a protocol of a standard computer interface, the standard computer interface e.g. being selected from a group comprising RS 232, Universal Serial Bus (USB) and Firewire interfaces.

The modulation can be accomplished by one of the usual modulation methods, e.g.:
 amplitude modulation,
 variation of amplitude modulation like DSSC (double side band suppressed carrier), quadrature amplitude modulation (QAM), and the like,
 frequency modulation,
 phase modulation,
 vector modulation, or
 digital modulation.
Moreover, the methods listed below can also be used.
 Pulse amplitude modulation,
 pulse frequency modulation,
 pulse phase modulation,
 pulse width modulation,
 pulse code modulation.
Also, keying methods can be used, for example phase shift keying (PSK) or amplitude shift keying (ASK). In particular, for digital signals modulation methods in accordance with the following standards can be used:
 QPSK, 8PSK, 16PSK (simultaneous transmission of multiple bits),
 QAM (16QAM, 32QAM, 64QAM etc.) (simultaneous transmission of multiple bits), or
 DMT or OMDF (simultaneous transmission on a number of carrier frequencies).

In a preferred embodiment, for data transmission purposes from the first coil 30 to the second coil 35, frequency shift keying (57.6 kHz/115.2 kHz) is utilised. For the reverse direction, amplitude modulation on a carrier of 500 kHz is utilised. However, other parameter values are also workable.

In order to enhance the efficiency of the inductive coupling between the first coil 30 and the second coil 35, a ferromagnetic core can be included.

The inductive coupler 20 inevitably creates a magnetic stray field in the proximity thereof. This stray field might be exploited by potentially hostile third parties in particular:
a) to remotely locate the user wearing the jacket 10 by bearing of the direction from where the magnetic stray field originates, or
b) by eavesdropping the flow of information passing through the inductive coupler 20 by remotely picking up the magnetic stray field.

Hence, further advanced variations of the invention can be equipped with
a) a strong and effective TEMPEST shielding of the inductive coupler 20 and all wiring connected therewith; and
b) encryption/decryption means scrambling the flow of information passing through the inductive coupler 20 rendering any information picked up from the magnetic stray field worthless for an eavesdropping third party.

The TEMPEST shielding may comprise an encapsulation (not shown) of the inductive coupler 20 by metallic materials with corresponding electromagnetic and magnetic absorption properties. Furthermore, in advanced solutions, active shielding techniques can be used which are known e.g. from documents U.S. Pat. No. 5,165,098 and U.S. Pat. No. 5,297,201.

By such and similar means it is possible to provide a garment and/or an interface according to the invention which is resistant against electromagnetic interference (EMI).

Also it is possible to provide such a garment and/or interface which is resistant against attempts to eavesdrop the flow of data through the textile material forming the garment.

The encryption of the data flow through the inductive coupler 20 can be carried out by utilising well-known symmetric, asymmetric or hybrid cryptographic methods. A particular problem is the key management; i.e. the electronic equipment located at the inner side of the jacket 10 needs to be supplied with cryptographic key material that matches the cryptographic key material used by the electronic equipment located outside the jacket 10. This can be accomplished either manually by explicitly inputting proper cryptographic keys to each electronic component involved or by utilising a cryptographic key generation and distribution protocol. Suitable protocols are e.g. RSA (asymmetric), Triple-DES (symmetric) or Blowfish. Key exchange can be done using the COMSET scheme. Another point is the proper authentication of all electronic equipment connected to the signal path of the inductive coupler. For authentication purposes, protocols like Kerberos can be utilised. Technical details for a proper implementation of such cryptographic protocols can be obtained e.g. from Schneier, Bruce: Applied Cryptography, New York: John Wiley & Sons, Inc., 2nd edition, 1996.

Furthermore, in advanced variants, the inductive coupler 20 is hardened against interference by inbound electromagnetic radiation and/or strong alternating magnetic fields, e.g. emerging from nearby radio transmitters, strong alternating magnetic fields in the vicinity of power transformers and the like. For military applications, the inductive coupler 20 can also be hardened against electromagnetic pulses (EMP).

Figure 3:
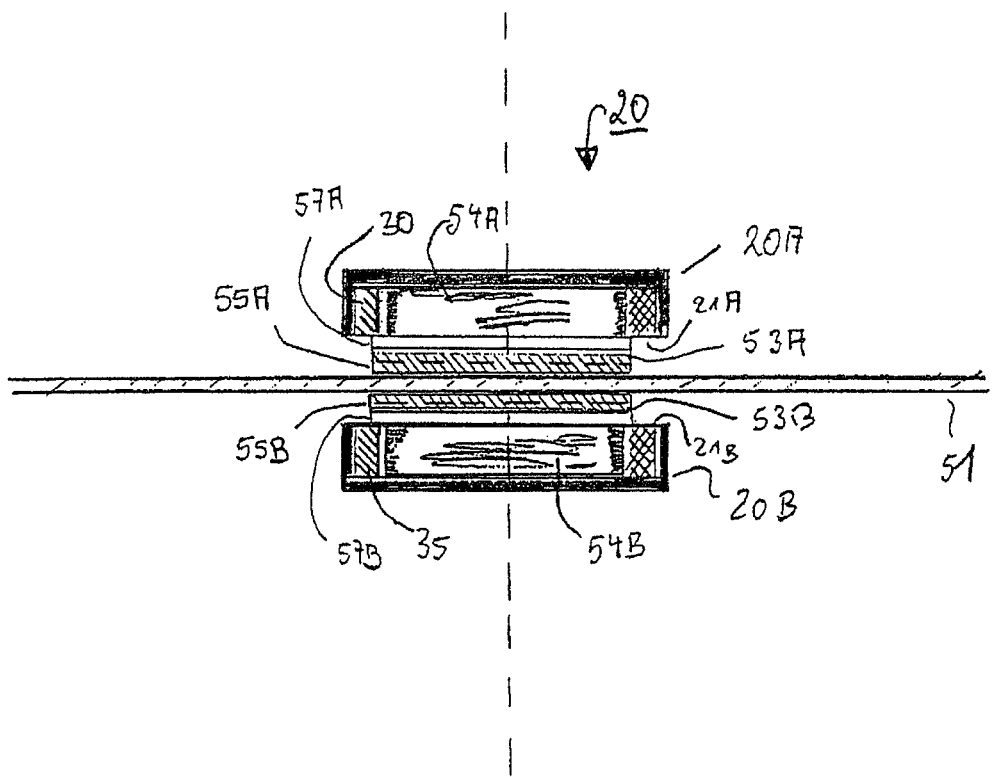
FIG. 3 shows a cross section of a first embodiment of a garment with an inductive coupler in accordance with the present invention.

In FIG. 3, reference numeral 51 designates a flexible material layer, e.g. a fabric, of which the jacket 10 in FIG. 1 is made. A first embodiment of the inductive coupler 20 comprises a first coupler element 20A to be applied on the outer side of the jacket 10 as well as a second coupler element 20B to be applied on the inner side of the jacket 10. Both coupler elements 20A, 20B are attached to the outer side and the inner side of the fabric, respectively, at approximately the same location. Preferably, the first coupler element 20A and the second coupler element 20B are mounted on the fabric 51 approximately at the same location by means of a hook-and-loop fastener 53A, 53B, respectively. On each side of the fabric 51, a belt 55A, 55B is permanently fixed on the surface of the fabric, i.e. by means of an adhesive or by a seam (not shown). A corresponding counterpart belt 57A, 57B designed to be matchable with the corresponding belt 55A and 55B, respectively, are permanently attached (e.g. by an adhesive layer) to a polar outer surface 21A, 21B of the first and second coupler elements 20A, 20B, respectively. Reference numerals 54A and 54B indicate optional ferrite cores inside the first coupler element 24A and inside the second coupler element 24B, respectively. Either one of the coupler elements 24A, 24B or both of them can be equipped with a ferromagnetic ferrite core in order to enhance the coupling efficiency.

By means of the hook-and-loop fastener 53A, 53B, both the first and the second coupler elements 20A, 20B can removably be attached to the outer side and the inner side of the fabric 51, respectively.

The electrical components of the embodiment as depicted with FIG. 3 correspond to those as shown in FIG. 2. In particular, the first coupler element 20A comprises a first coil 30, and the second coupler element 20B comprises a second coil 35, both coils 30, 35 forming a loosely coupled transformer.

The advantage that comes with this specific first embodiment of the invention is that the fabric 51 need not be pierced at the location where the inductive coupler 20 is applied. However, as the magnetic field has to pass through the fabric, the electrical efficiency of such a construction is somewhat lower than that of any different construction where the fabric 51 is pierced at the location where the first coupler element 20A and the second coupler element 20B are mated.

In the embodiment depicted in FIG. 3, the second coupling unit 20B comprises a peripheral shoulder 90 positioned against one side of the functional layer or laminate, respectively, and a peripheral counter device 91 is peripherally overlapping the shoulder, positioned against the other side of the flexible material layer 51 and fixed to the second coupling unit 20B in such a way that the functional layer is clamped between the shoulder 90 and the counter device 91 in a waterproof manner.

Figure 4:
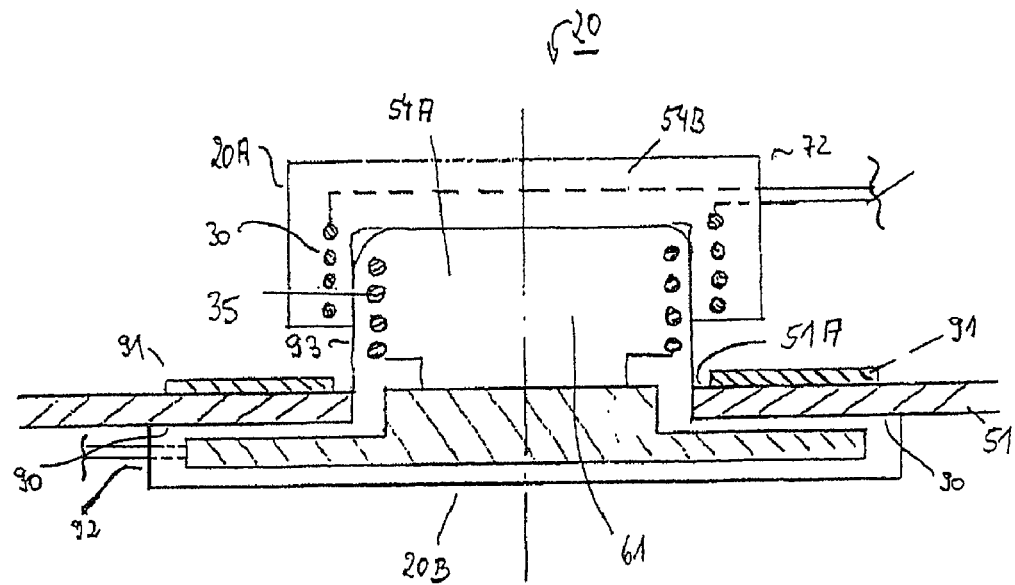
FIG. 4 shows a cross section of a second embodiment of a garment with an inductive coupler in accordance with the present invention.

FIG. 4 shows a cross section of a second embodiment of the jacket 10 in accordance with the invention as depicted with FIG. 1. In this embodiment, a flexible material layer or a flexible fabric 51 of the jacket 10 is pierced in a circle-shaped area 51A. The second coupler element 20B is mounted e.g. by an adhesive layer (not shown) on the inner side of the fabric 51. The second coupler element 20B comprises a cylindrically shaped projection 61 on which the first coupler element 20A can be mounted.

The electrical components of the embodiment as depicted in FIG. 4 correspond to those as shown in FIGS. 2 and 3. In particular, the first coupler element 20A comprises a first coil 30, and the second coupler element 20B comprises a second coil 35, both coils 30, 35 forming a loosely coupled transformer.

In this embodiment, the magnetic flux does not need to pass through a fabric. Hence, this version can be made more effective with regard to the energy and signal transport.

Reference numerals 54A and 54B indicate optional ferrite cores inside the first coupler element 24A and inside the second coupler element 24B, respectively. Either one of the coupler elements 24A, 24B or both of them can be equipped with a ferromagnetic ferrite core in order to enhance the coupling efficiency.

In the embodiment depicted in FIG. 4, the second coupling unit 20B comprises a peripheral shoulder 90 positioned against one side of the flexible material layer 51. The second coupling element 20B has a platform 92 forming an internal section and a projection 93 extending from the platform 92 through the receiving opening 51A, forming an external section and having embedded therein the second coil 35, the shoulder 90 being formed at the transition from the platform 92 to the projection 93. The first coupling element 20A comprises a hood-shaped portion 72 designed to cap the projection of the second coupling element 20B, having embedded therein the second coil 35 in a position in which it is radially adjacent to the second coil 35 when the hood-shaped portion 72 caps the projection of the second coupling element 20B.

Figure 5A:
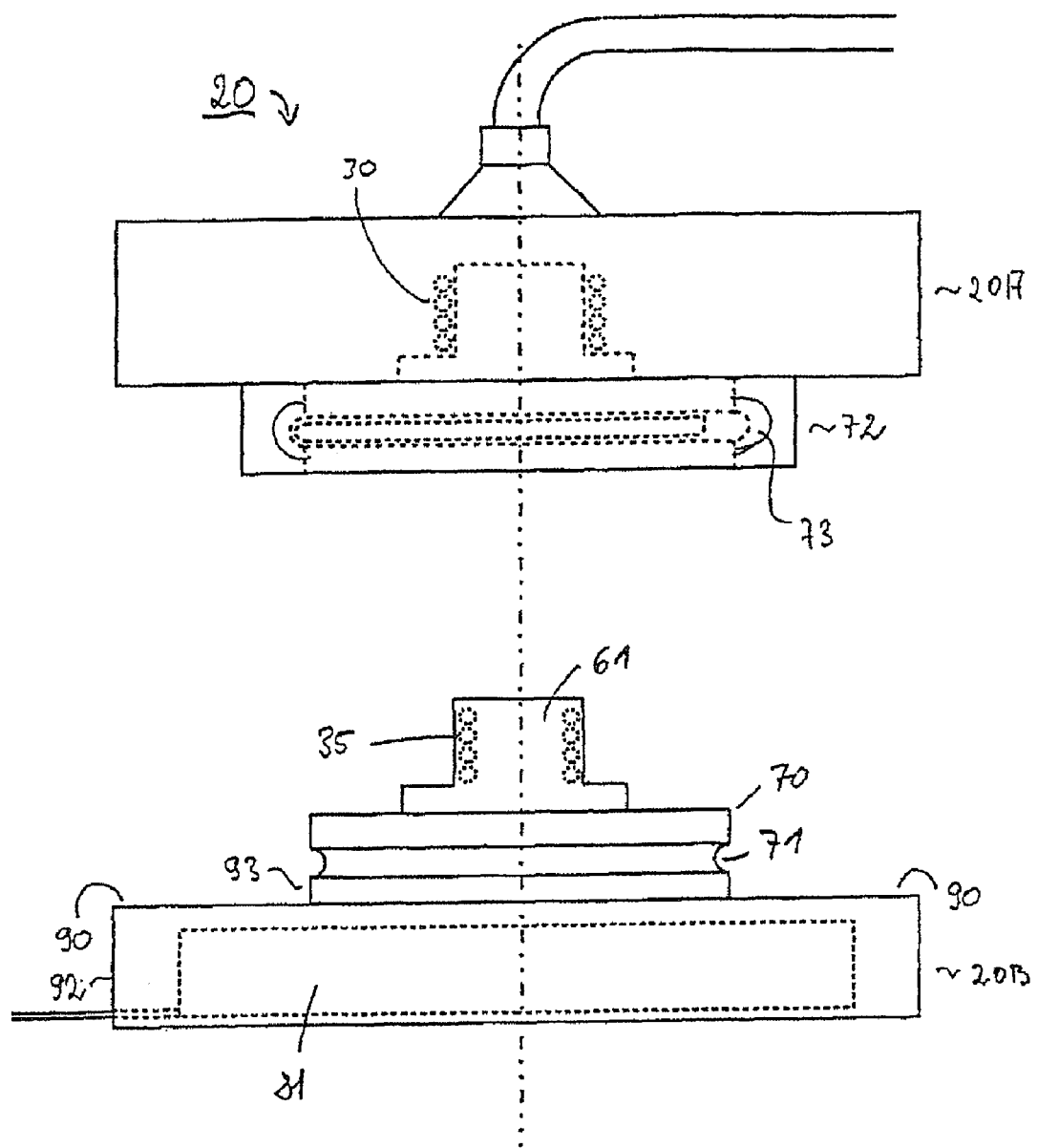
Figure 5B:
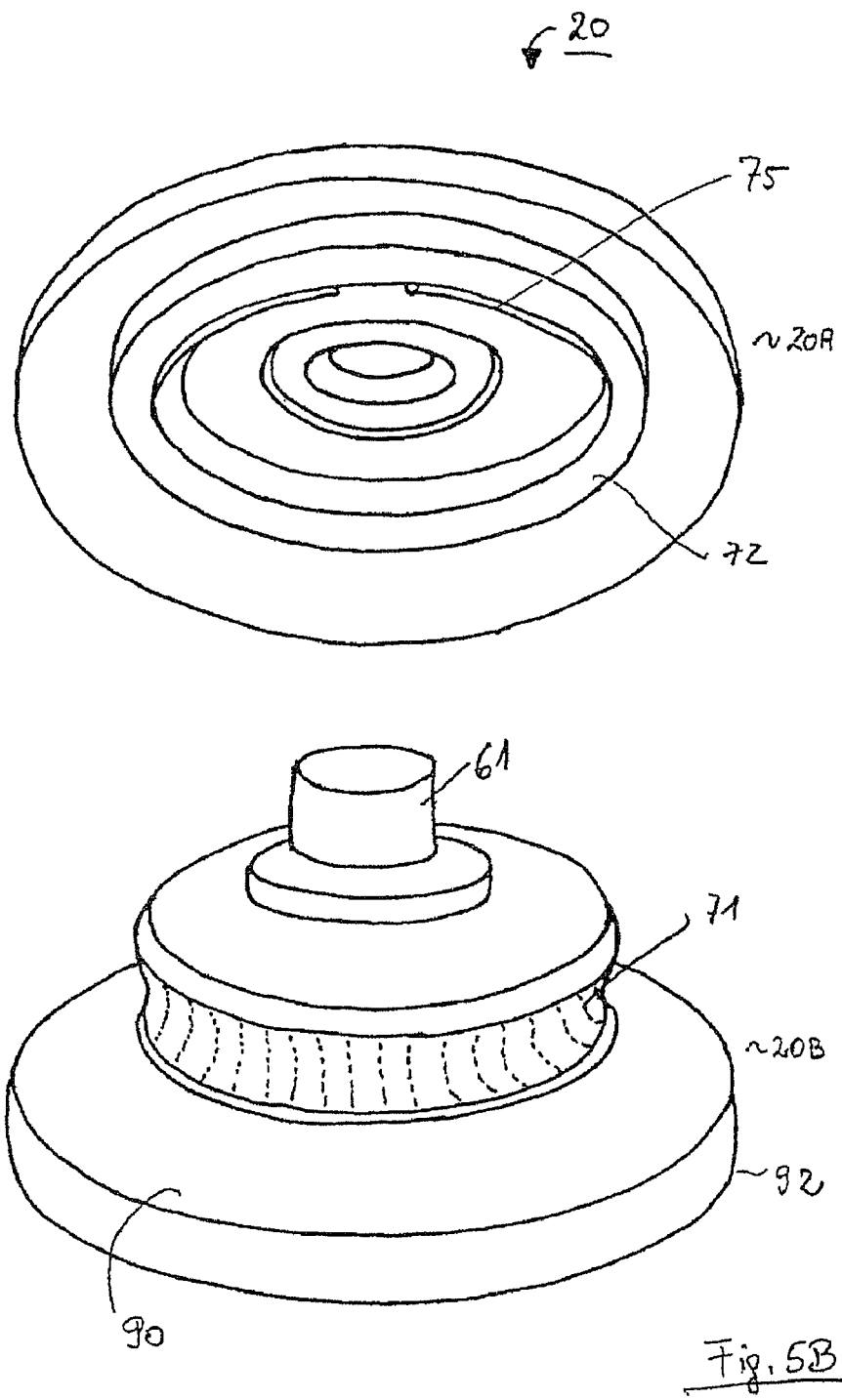
FIG. 5b shows a corresponding perspective view thereof.

FIG. 5 shows the variation of the inductive coupler 20 as depicted in FIG. 4. Unless stated otherwise, the reference numerals should be read as for FIG. 4. In particular, FIG. 5a shows a cross section of such a coupler 20, whereas FIG. 5b shows a corresponding perspective view thereof.

In the embodiment depicted in FIG. 5, the second coupling unit 20B comprises a peripheral shoulder 90 positioned against one side of the flexible material layer 51. The second coupling element 20B has a platform 92 forming an internal section and a projection 93 extending from the platform 92 through the receiving opening 51A, forming an external section and having embedded therein the second coil 35, the shoulder 90 being formed at the transition from the platform 92 to the projection 93. The first coupling element 20A comprises a hood-shaped portion 72 designed to cap the projection of the second coupling element 20B, having embedded therein the first coil 30 in a position in which it is radially adjacent to the second coil 35 when the hood-shaped portion 72 caps the projection of the second coupling element 20B.

The inductive coupler 20 as shown in FIG. 5 is enhanced with regard to certain mechanical properties.

The electrical components of the embodiment as depicted with FIG. 3 correspond to those as shown in FIGS. 2, 3, and 4. In particular, the first coupler element 20A comprises a first coil 30, and the second coupler element 20B comprises a second coil 35, both coils 30, 35 forming a loosely coupled transformer.

The second coupler element 20B comprises a cylindrical engagement section 70 with a circumferential groove 71 formed therein. The hood-shaped portion 72 is designed to mate with the cylindrical engagement section 70 of the second coupler element 20B. The hood-shaped portion 72 comprises at the inner side thereof a groove 73 corresponding to the groove 71 of the cylindrical engagement section 70 of the second coupler element 20B. The groove 73 is provided with a spring element 75 for providing a snap-in fixing of both the first and the second coupler elements 20A, 20B.

In a still more advanced version of the embodiment, a second coupler element 20B comprises a chamber 81 at the bottom side thereof designed to receive electronic circuitry (not shown), in particular a printed circuit board with all necessary components mounted thereon to form the electronic unit 42.

In another variant (not shown) the electronic unit 41 can be placed into the first coupler element 20A.

In alternative variants, the first and second coupler elements 20A, 20B can be secured by other means, e.g. by screwing means, snap-in members, permanent magnets etc.

The embodiments of the present invention can be further enhanced by providing a garment 10 comprising enhanced textile materials having some sort of a membrane (e.g. made of microporous expanded polytetrafluoroethylene ePTFE) which is permeable for water vapour but impermeable for water in the liquid form. Frequently such a membrane is utilised to allow evaporation of perspiration emanated by the user wearing the garment 10 while at the same time blocking the penetration of liquid water from the environment into the inner side of the garment 10 where intruding liquid water would cause severe discomfort to the user. In preferred embodiments, the membrane which tends to be mechanically sensitive is utilised in the form of a laminate of two or more layers. In an embodiment, the fabric forming the outer side of the garment 10 is identical with one of the layers of the membrane laminate. In a more preferred embodiment, the membrane is) covered on the one side by a first fabric and on the other side by a second fabric, all of those layers forming a three-layer laminate, and the three-layer laminate being inserted at the inner side of the garment 10.

In embodiments of the present invention where one of the coupler elements 20A, 20B is glued by means of an adhesive to the fabric of the garment 10, a membrane laminate can be provided on the inner side of the garment 10, i.e. the side of the garment 10 which is directed to the user's body. In order to make sure that liquid water cannot penetrate into the space on the inner side of the garment 10 in embodiments where a coupler element 20A, 20B is fixed by gluing at the circumference of an opening cut into the fabric of the garment 10, the area where the element is glued to the fabric of the garment 10 must be made waterproof.

Preferably this can be ensured by selecting an appropriate adhesive as well as an appropriate method of applying the adhesive. In preferred embodiments, the garment 10 comprises a membrane laminate glued to the second coupler 20B by a polyurethane adhesive, by adhesives comprising fluoric polymers, by a silicone adhesive, or by a reactive hot-melt adhesive. A reactive hot-melt adhesive is any adhesive or sealant that can be applied at elevated temperatures as a liquid melt and can be caused to react to become a non-meltable thermosetting plastic polymer with enhanced adhesive and sealing properties.

Figure 6:
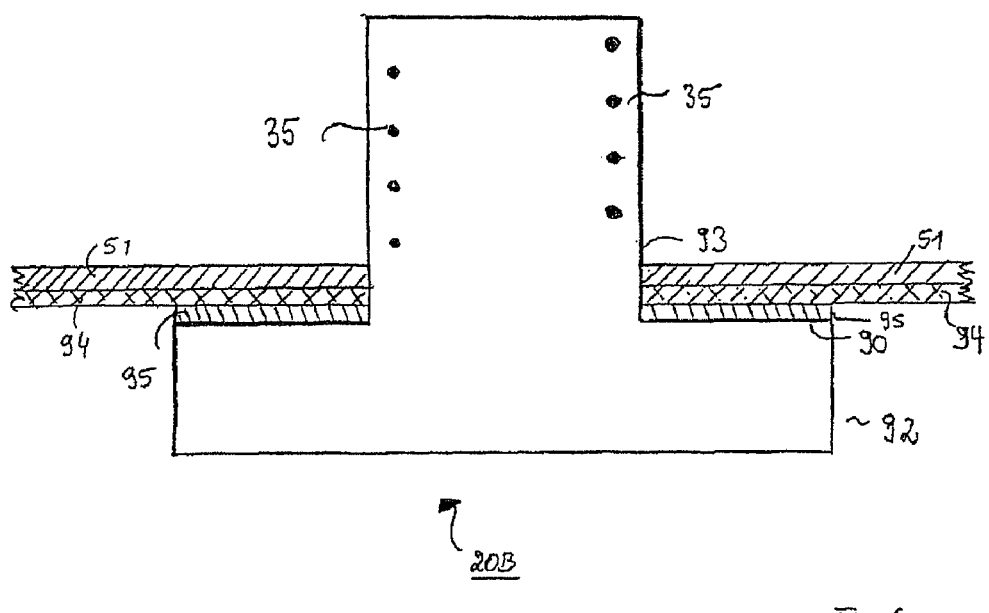
FIG. 6 shows a cross section of a second coupler element glued to a laminate comprising a flexible material forming a garment in accordance with the invention.

FIG. 6 shows a cross section of a second coupler element 20B glued to a laminate comprising a flexible material layer 51 forming a garment 10 in accordance with the invention. The flexible material layer 51 is combined with a functional layer 94 to form a laminate. The glue is indicated with reference numeral 95. The shoulder 90 of the second coupler element 20B is attached to the functional layer 94 by the glue 95. Although the depicted laminate has only two layers, other embodiments may use laminates with more layers. Reference numeral 35 indicates the second coil. In this particular case, the general shape of the second coupler element 20B is the same as depicted with FIG. 4; however, variants thereof may also be utilised. It should be noted that this kind of glue-based connection is in particular also applicable to the embodiment shown in FIG. 5.

In conjunction with the present invention, preferably an adhesive with a low viscosity is utilised in order to make sure that the adhesive in its liquid state can go through the layer of fabric of the membrane laminate in order to glue directly to the membrane layer. Furthermore, using a low-viscosity adhesive facilitates the impregnation of the micro-pores in the membrane layer with adhesive so that the adhesive bonding is more durable. Either the preferred adhesive has a sufficiently low value of viscosity per se or the adhesive can be transformed into a low-viscosity state e.g. by heating.

Another advantageous option is to provide a membrane laminate where the fabric layer used for adhesive bonding to the coupler is made of meltable fibres (e.g. polypropylene, polyester, polyamide). When mounting the coupler, the meltable fibres can be heated and bonding can be obtained by mechanically pressing the coupler against the fabric. This technology does, however, not work if non-meltable fibres are used, e.g. aramid fibres in garments 10 for fire-fighters or the like. A further improvement can be obtained by using in the membrane laminate a fabric woven from a yarn consisting of a number of strands made of different materials. For example, the yarn might comprise at least one strand of a meltable material and at least one strand made of a non-meltable material. By utilising such a yarn it can be assured that the resulting membrane laminate is mechanically heat resistant as well as glueable when heated.

When utilising a clamping plate in order to fix a coupler at a garment 10 comprising a membrane laminate, the contact pressure has to be sufficiently high that no liquid water can penetrate the contact area between the coupler and the membrane laminate fabric up to the inner side of the garment 10. Mechanically this can be accomplished by utilising two corresponding screw threads on the corresponding coupler elements 20A, 20B. In more preferred embodiments, a sealant is put between the fabric of the membrane laminate and the pressing surface of the respective coupler element 20A, 20B.

The embodiments of the variants as described above are of a type where the attached electrical networking equipment can be easily removed.

In particular, water-tight embodiments of the garment can also be used in adverse or dangerous environments and even in underwater conditions. It is even possible to have a garment according to the invention which is washable under the same conditions as the material of the garment.

All features disclosed above with different embodiments can be combined together.

The invention claimed is:

1. An inductive clothing interface (20) having a flexible material layer (51) and an inductive coupling means (20A, 20B) which is designed to transmit electric power and/or data between an inner side and an outer side of the flexible material layer (51):
    the flexible material layer (51) being provided with an opening (51A);
    the inductive coupling means (20A; 20B) having a first coupling unit (20A) and a second coupling unit (20B), which are located on different sides of the flexible material layer (51);
    the first coupling unit (20A) having a first coupling portion which is accessible from the outer side of the flexible material layer (51) and is provided with a first coil (30) embedded in an insulating material of the first coupling portion and is designed for an operative connection with an external electric system located at the outer side of the flexible material layer (51);
    the second coupling unit (20B) being fixed to the flexible material layer (51) and having a second coupling portion which is received in the opening (51A) of the flexible material layer (51), is designed for a detachable mating with the first coupling portion and is provided with a second coil (35) embedded in an insulating material of the second coupling portion and designed for an operative connection with an internal electric system located at the inner side of the flexible material layer (51); and
    the first and second coupling units (20A, 20B) being designed such that the first and second coils (30, 35) are able to perform said inductive transmission of electric power and/or data when the first and second coupling portions are mated.

2. The interface (20) according to claim 1, wherein the second coupling unit (20B) has an internal section which extends from an inner surface of the flexible material layer (51) and an external section which extends from an outer surface of the flexible material layer (51).

3. The interface (20) according to claim 2,
    wherein the second coupling unit (20B) has a platform (92) forming the internal section and a projection (93) extending from the platform (92) through the receiving opening (51A), forming the external section, the second coil (35) being embedded in the projection (93) and the shoulder (90) being formed at the transition from the platform (92) to the projection (93), and
    wherein the first coupling unit (20A) comprises a hood-shaped portion (72) designed to cap the projection of the second coupling unit (20B), the first coil (30) being embedded in the hood-shaped portion (72) in a position in which it is radially adjacent to the second coil (35) when the hood-shaped portion (72) caps the projection of the second coupling unit (20B).

4. The interface (20) according to claim 3, wherein the projection (93) of the second coupling unit (20B) and the hood-shaped portion (72) of the first coupling unit (20A) each have a cylindrical shape.

5. The interface (20) according to claim 4, wherein the platform (92) of the second coupling unit (20B) is cylinder-shaped, having a diameter which is larger than the cylinder diameter of the projection (93), the shoulder (90) being formed at the transition from the larger diameter to the smaller diameter, and the counter device (91) being ring-shaped.

6. The interface (20) according to claim 5, wherein the ring-shaped counter device (91) is screwed onto the cylinder-shaped projection (93).

7. The interface (20) according to claim 1, wherein the second coupling unit (20B) is fixed in a waterproof manner in a receiving opening of a waterproof functional layer, with which the flexible material layer (51) is provided.

8. The interface (20) according to claim 7, wherein the watertight connection between the second coupling unit (20B) and the functional layer is formed by means of a waterproof adhesive.

9. The interface (20) according to claim 7, wherein the flexible material layer (51) and the functional layer are components of a laminate having at least two laminate layers.

10. The interface (20) according to claim 7, wherein the second coupling unit (20B) has a peripheral shoulder (90) which is positioned against one side of the functional layer or laminate, respectively, and a peripheral counter device (91) peripherally overlapping the shoulder (90), which is positioned against the other side of the functional layer or laminate, respectively, and fixed to the second coupling unit (20B) in such a way that the functional layer is clamped between the shoulder (90) and the counter device (91) in a waterproof manner.

11. The interface (20) according to claim 1, wherein the first coupling unit (20A) and the second coupling unit (20B) are detachably connectable to each other by means of a screw mechanism.

12. The interface (20) according to claim 1, wherein the first coupling unit (20A) and the second coupling unit (20B) are detachably connectable to each other by means of a snap mechanism.

13. The interface (20) according to claim 1, wherein the first coupling unit (20A) and the second coupling unit (20B) are detachably connectable to each other by means of permanent magnets.

14. The interface (20) according to claim 1, wherein at least one of the first and second coupling units (20A, 20B) includes an electronic circuit designed to convert data signals to be coupled through the coupling device in accordance with at least one predefined data transmission protocol.

15. An article of clothing (10), which is provided with a clothing interface (20) according to claim 1, the flexible material layer (51) of the clothing interface (20) being formed by at least one layer (51) of a flexible material of the article of clothing (10).

16. The article of clothing (10) according to claim 15, wherein the at least one layer (51) of flexible material comprises a textile fabric.

17. The article of clothing (10) according to claim 15, wherein the at least one layer (51) of flexible material comprises a waterproof functional layer permeable for water vapour but impermeable for liquid water.

18. The article of clothing (10) according to claim 17, wherein the waterproof functional layer comprises a polytetrafluoroethylene membrane.

19. The article of clothing (10) according to claim 17, wherein the second coupling unit (20B) comprises a peripheral shoulder (90) positioned against one side of the functional layer or laminate, respectively, and a peripheral counter device (91) peripherally overlapping the shoulder, positioned against the other side of the functional layer or laminate, respectively, and fixed to the second coupling unit (20B) in such a way that the functional layer is clamped between the shoulder (90) and the counter device (91) in a waterproof manner.

20. The article of clothing (10) according to claim 15, wherein the first coupling unit (20A) and the second coupling unit (20B) are detachably fixed at the layer (51) of flexible material.

21. The article of clothing (10) according to claim 20, wherein the first coupling unit (20A) and the second coupling unit (20B) are detachably fixed at the layer (51) of flexible material by means of hook-and-loop fasteners (53A, 53B).

22. The article of clothing (10) according to claim 15, wherein the second coupling unit (20B) is permanently fixed at the layer (51) of flexible material.

23. The article of clothing (10) according to claim 22, wherein the first coupling unit (20A) is detachably fixed at the layer (51) of flexible material.

24. The article of clothing (10) according to claim 23, wherein the first coupling unit (20A) is detachably fixed at the layer (51) of flexible material by means of a hook-and-loop fastener (53A).

25. The article of clothing (10) according to claim 15, comprising a waterproof functional layer (94) lining the layer (51) of flexible material at least in a part of the article of clothing (10),
   the functional layer (94) being provided with a receiving opening aligned with the receiving opening (51A) of the layer (51) of flexible material,
   and the second coupling unit (20B) being fixed in the receiving opening of the functional layer (94) in a waterproof manner with respect to the functional layer (94).

26. The article of clothing (10) according to claim 25, wherein the layer (51) of flexible material and the functional layer are components of a laminate having at least two laminate layers.

27. The article of clothing (10) according to claim 26, wherein the waterproof connection between the first coupling unit (20A) and the laminate is made by means of a waterproof adhesive.

28. The article of clothing (10) according to claim 15, wherein the second coupling unit (20B) has an internal section extending from an inner surface of the layer (51) of flexible material and an external section extending from the outer surface of the layer (51) of flexible material.

29. The article of clothing (10) according to claim 28,
   wherein the second coupling unit (20B) has a platform (92) forming the internal section and a projection (93) extending from the platform (92) through the receiving opening (51A), forming the external section, the second coil (35) being embedded in the projection (93) and the shoulder (90) being formed at the transition from the platform (92) to the projection (93), and
   wherein the first coupling unit (20A) comprises a hood-shaped portion (72) designed to cap the projection of the second coupling unit (20B), the second coil (35) being embedded in the hood-shaped portion (72) in a position in which it is radially adjacent to the first coil (30) when the hood-shaped portion (72) caps the projection of the first coupling unit.

30. The article of clothing (10) according to claim 29, wherein the projection (93) of the second coupling unit (20B) and the hood-shaped portion (72) of the first coupling unit (20A) each have a cylindrical shape.

31. The article of clothing (10) according to claim 29, wherein
   the platform (92) of the second coupling unit (20B) is cylinder-shaped, having a diameter which is larger than the cylinder diameter of the projection (93),
   the shoulder (90) being formed at the transition from the larger diameter to the smaller diameter,
   and the counter device (91) being ring-shaped.

32. The article of clothing (10) according to claim 31, wherein the ring-shaped counter device (91) is screwed into the cylinder-shaped projection (93).

* * * * *